Figure 1:
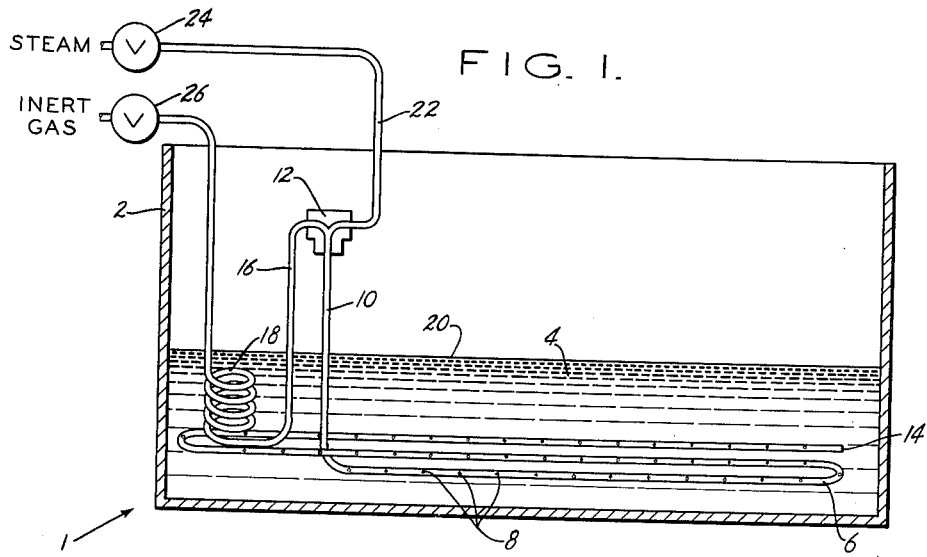

Feb. 15, 1966  J. W. KENNETTE  3,235,402
METHOD OF SIZING YARN WITH POLYVINYL ALCOHOL
Filed May 12, 1961

JOHN W. KENNETTE
INVENTOR.

BY *Maynard L. George*

ATTORNEY

United States Patent Office 3,235,402
Patented Feb. 15, 1966

3,235,402
METHOD OF SIZING YARN WITH
POLYVINYL ALCOHOL
John W. Kennette, Somerville, N.J., assignor, by mesne assignments, to Cumberland Chemical Corporation, New York, N.Y., a corporation of Delaware
Filed May 12, 1961, Ser. No. 109,614
7 Claims. (Cl. 117—115)

This invention relates generally to prevention or substantial elimination of the adverse effects caused by skinning and gelation in liquid coating compositions comprising polyvinyl alcohol. Skinning refers to the formation of films predominantly at the surface, but also at the sidewalls as well as to a slight extent throughout the mass of the solution, in pools of such coating compositions. Gelation refers to the tendency of the polymeric materials to form a loose physico-chemical association of the polymer molecules in pools of such coating compositions. When skinning and/or gelation occur, it is difficult to apply a uniform film to the substrata being treated from the coating composition pool.

The teachings described herein are particularly useful with aqueous solutions of polyvinyl alcohol. For purposes of describing the invention, the following description is directed to coating compositions comprising aqueous solutions or mixtures of polyvinyl alcohol.

Aqueous mixtures or solutions of polyvinyl alcohol have been used to coat or size yarn. The polyvinyl alcohol forms tough and rugged, although elastic and flexible, cold water resistant and tenaciously adherent films on the yarn.

In carrying out the coating or sizing by dipping, or transfer rolls, difficulty in achieving a uniform film coat has been encountered with polyvinyl alcohol solutions because of the tendency for such solutions to skin or form a film predominantly at the surface, but also at the sidewalls, and to a certain extent, within the mass of the solution itself.

The rate of skin formation is a function of the solution temperature concentration of solution and grade of polyvinyl alcohol employed. Higher temperatures give more rapid skinning. However, utilization of polyvinyl alcohol solutions at a relatively low temperature may limit, and in some cases make impossible, the use of polyvinyl alcohol for coating applications. A lower solution temperature, for example, would require more heat capacity for water removal in the drying section of the coating machine. A lower solution temperature would also limit the quantity of coating that can be applied to the yarn, because at any given solution concentration and grade of polyvinyl alcohol, the solution viscosity is higher at the lower temperatures. Hence in order to get a solution with a sufficiently low viscosity to permit application, the percent polyvinyl alcohol in the solution at low temperatures must be reduced. This results in lower coat weights per pass.

An additional difficulty encountered with polyvinyl alcohol solution is a tendency of such solutions towards gelation, especially when they contain polyvinyl alcohol having a degree of hydrolysis of above about 99 percent. If the coating solution contains a large amount of gel, or if skinning is present in the solutions to any significant extent, it is difficult to apply a uniform film to the yarn being treated.

These and other problems connected with the use of coating solutions of polyvinyl alcohol are overcome or substantially reduced by the present invention.

According to the present invention, it has been discovered that the adverse effects of skinning and gelation in solutions of polyvinyl alcohol may be prevented by bubbling a gas inert to the materials making up the solution through the solution at such a rate and manner as to make the solution appear as though it were boiling.

The rate of flow of the inert gas through the solution should be high enough to cause bubbles to break from the surface. In this way, the surface of the coating composition is continually turned under, and the skin or film is continuously dispersed as it is formed. The bubbling of the inert gas through the solution also tends to break and prevent from forming any gel which otherwise may form and to destroy or redisperse the gel particles.

As examples of inert gas may be mentioned air, nitrogen, carbon dioxide, and the like, or any of the inert gases in Group O of the Periodic Table of Elements. Preferably, the inert gas is air.

The inert gas may be introduced into the solution in any convenient manner. Preferably, it is introduced below the surface of the pool of the coating composition at evenly distributed points over substantially the entire horizontal cross sectional area of the pool. Especially good results are achieved when it is introduced adjacent the floor or bottom of the means, such as a tank, drum, and so forth, enclosing or containing the solution. In terms of the depth of the pool, it is preferred to introduce the gas below the vertical midpoint of the pool. In this way, the gas flows upwardly through a considerable portion of the solution prior to reaching the surface, thereby setting up the turbulence required.

Although inert gas, by itself, is generally sufficient to reduce or substantially eliminate the adverse effects of skinning and/or gelation, it has also been found desirable to bubble steam through the solution in addition to the gas. The introduction of steam may be used as may assist in maintaining the temperature of the solution, and, also, by condensation, compensating for the loss of water by evaporation. The rate and temperature of the steam should be such as to compensate for the water lost by evaporation, and to maintain the temperature at the desired level. In this manner, uniform temperature, concentration and viscosity of the solution during the coating operation may be maintained.

The steam may be introduced into the solution separately, or admixed with the inert gas. Prior to introduction into the solution, the inert gas may be preheated. This may be conveniently done by utilizing the hot coating solution itself as a preheater, as will be clear from the following description.

The temperature of the coating solution may vary from room temperature up to the boiling point of the solution. In most applications, it is desirable to maintain the temperature below the boiling point of the solution. Usually, the solutions are maintained between about 65 and 85° C.

If desired, anti-foaming agents may be added to the coating composition to reduce or eliminate foaming caused by the currents set up in the coating solutions. Typical of the anti-foaming agents which may be used are the octyl alcohols, such as octanol-2 and 2-ethylhexanol, and other higher alcohols, including cyclohexanol, lauryl and cetyl alcohols, and the higher by-product alcohols from methanol synthesis. The higher 1,2 and 1,3 glycols are also effective anti-foaming agents. Particularly suitable anti-foaming agents are acetylenic alcohols and glycols and ethylene oxide and propylene oxide adducts of acetylenic alcohols and glycols. The latter anti-foaming agents, in addition to retarding foam, have also been found, by themselves, to aid in prevention of skin formation and/or gelation.

The amount of anti-foaming agent employed should be quite low, ordinarily less than 2 percent by weight of the solution, and preferably between about 0.05 and 1 percent by weight of the solution.

As indicated above, the techniques described prevent or substantially eliminate the adverse effects of skinning and gelation, thereby enabling application of a uniform film to the material being treated.

The water-soluble polyvinyl alcohol suitable for use in the coating compositions described herein is prepared by saponification of polyvinyl acetate. The method of preparing polyvinyl alcohol from polyvinyl acetate is well understood in the art, and does not constitute part of the present invention.

Polyvinyl alcohol polymers having a viscosity between about 2 and 150 centipoises in a 4 percent solution at 20° C. are suitable for this application.

Especially suitable for use in the coating solutions of the present invention is polyvinyl alcohol which has an extremely high degree of hydrolysis. Such materials are known in the art as super-hydrolyzed polyvinyl alcohol resin or fully hydrolyzed polyvinyl alcohol resin. The super grade may have a degree of hydrolysis of 99.84 percent or higher, and the fully hydrolyzed grade may have a percent hydrolysis of 99+ percent or higher. Such material is sold under a variety of trade names. Among the commercially available super-hydrolyzed grades may be mentioned VINOL 125 produced by Air Reduction Company, Incorporated. Among examples of fully hydrolyzed polyvinyl alcohol having a percent hydrolysis of 99+ percent may be mentioned VINOL 260, VINOL 230 and VINOL 205, produced by Air Reduction Company, Incorporated. Other polyvinyl alcohols having a percent hydrolysis between about 97 percent and 98 percent and sold under the trade names VINOL 350 and VINOL 355 by the same company are also especially suitable.

The super-hydrolyzed and fully hydrolyzed grades of polyvinyl alcohol have the advantage that films produced therefrom are extremely resistant to attack by cold water. The resistance of films produced from hydrolyzed water-soluble polyvinyl alcohol to cold water attack apparently reaches a maximum when the degree of hydrolysis of the polyvinyl alcohol is at a maximum.

The concentration of polyvinyl alcohol in the aqueous coating solutions will vary with the polymerization number of the polyvinyl alcohol polymer employed and the degree of hydrolysis of the polymer. In general, the aqueous coating solutions may contain from about 1 to 40 percent, and usually between about 1 to 20 percent, by weight of polyvinyl alcohol. The higher concentrations are preferred because they present less water to be removed in the drying steps and because they make possible the application of greater amounts of solids per unit area of the stock. The procedures described herein may be used with success on solutions having a viscosity of up to 50,000 centipoises. The viscosity/concentration relation of the aqueous coating solution varies with the particular polymer employed, and also, of course, with the temperature at which coating occurs. For a given concentration of a given polymer, the viscosity of the coating solution will generally vary inversely with the temperature.

Figure 2:
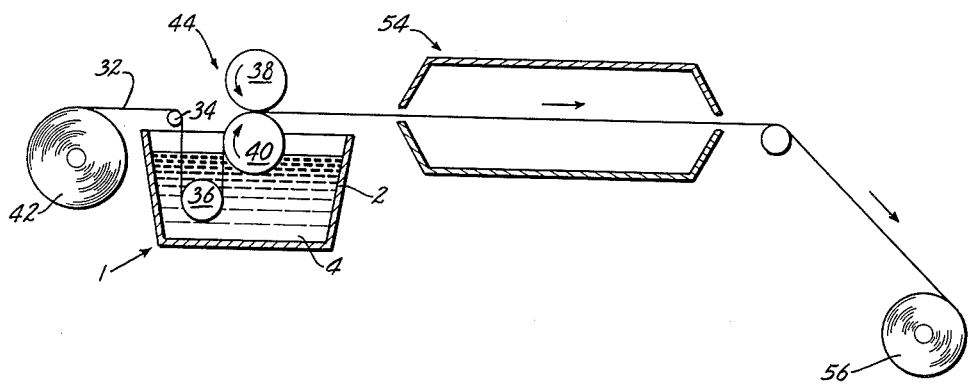

FIGURES 1 and 2 are schematic illustrations of apparatus useful in carrying out the improvements disclosed herein. In the drawings, similar reference numerals indicate similar parts.

In FIGURE 1, there is shown generally at 1 a coating apparatus embodying the features disclosed herein. A trough 2 open at its upper end contains a pool of the coating composition 4. In the trough and adjacent the bottom thereof is a spray header 6 provided with a plurality of evenly distributed apertures or holes 8. The spray header 6 is connected at one end with an inlet tube 10 leading from a mixing valve 12. At its opposite end 14 the spray header is closed. Also leading into the mixing valve 12 is an inert gas tube 16 which has a coiled portion 18 below the surface 20 of the coating solution. The gas tube 16 is connected above the coiled portion to a source of inert gas (not shown). Also leading into mixing valve 12 is a steam line 22 which is connected to a steam source (not shown). Valves 24 and 26 regulate the flow of inert gas and steam to mixing valve 12.

Spray header 6 is disposed horizontally in trough 2 and adjacent the bottom thereof, and, as indicated, covers substantially the entire cross sectional area of trough 2. The apertures 8 are evenly distributed over the spray header at intervals of about ½ to 4 inches, and preferably at intervals of about 1½ to 2½ inches. The apertures may be between about 1 and 3 mm. in diameter.

The inert gas in passing from valve 26 flows through the coiled portion 18 of tube 16 and is thereby preheated to about the temperature of the coating solution in the trough. It then flows into the mixing valve 12 where it is admixed with steam from line 22. The admixture of gas and air flows into the spray header by a line 10 and then out of the plurality of apertures 8 in the spray header and into the coating composition. The gas-steam mixture streams from the apertures upwardly through the coating solution, and breaks from the surface 20 of the solution, thereby setting up the currents which prevent the formation of the skin and gel particles and serve to break up and redisperse any skin and gel particles which may form.

When it is desired to employ only the inert gas, valve 24 may, of course, be closed, thereby shutting off the source of steam.

Any suitable method of effecting coating from the pool shown in FIGURE 1 may be employed. The coating can be accomplished by transfer roll, dipping or any other commercial coating methods now in use.

After the base material is coated, it is dried to effect substantially complete removal of the water therefrom. Ordinarily it is dried to approximately 3 percent moisture content by passing through a heated tunnel oven or other type of drying equipment.

The temperature at which the coated material is dried is not critical. However, care must be exercised so that the liquid does not evaporate at a rate of sufficient magnitude to form steam bubbles, which would tend to make the surface of the film uneven. In general, drying temperatures of between about 160° to 260° F. are most suitable. If calendering is employed, the drum temperature may also suitably be between about 160° to 195° F.

FIGURE 2 shows an apparatus for applying the coating composition from the pool shown in FIGURE 1 to textiles, and the like.

In FIGURE 2, the pool of the coating composition 4 is held in a coating apparatus generally designated 1. The trough 2 corresponds to that shown in FIGURE 1, and has provision for introduction of steam and inert gas as shown in FIGURE 1.

In FIGURE 2 the material to be coated 32 is withdrawn continuously from a supply roll 42 and passes through coating device 44 which may be of any suitable type and which may coat only one side or both sides of the material 32 with the coating composition. As illustrated, coater 44 may embody guide rolls 34 and 36, arranged as indicated. Guide roll 36 is submerged in coating composition 4. Rolls 38 and 40 are pressure rolls with roll 40 dipping below the level of the coating composition. Rolls 38 and 40 may engage the material 42 passing therebetween with any suitable pressure, as is well understood.

The coated web then passes through a suitable drying means 54 to effect removal of substantially all of the water under suitable conditions of temperature, after which it may be wound on product roll 56. The drying means 54 may be a drying oven or tunnel, drying cans, and the like.

If calendering is desired, this may conveniently occur between the dryer 54 and the roll 56.

While a continuous process has been illustrated in the drawing, it will be understood that a batch or discontinuous process may also be employed.

The nature of the present invention will be clear from the following examples, which, although illustrative, are not intended to limit the scope of the invention, except as such limitations may appear in the claims.

Example 1

An apparatus corresponding to that shown in FIGURE 1 is set up. The trough is a 2′ x 1′ x 1′ container. The sprayer head and all tubes leading thereto are formed of ¼″ O.D. copper tubing. The tube forming the sprayer head has holes 2 mm. in diameter spaced 2 inches apart on the surface of the tubing opposite the bottom of the trough.

The trough is charged with 5 gallons of a 2.5 percent aqueous solution of polyvinyl alcohol sold under the trade name VINOL 260, described above, and fitted with a coating apparatus similar to that shown in FIGURE 2. The temperature of the solution is 85° C.

A mixture of air and steam is charged to the spray header using the mechanism described in the drawing and from the spray header is bubbled through the solution at a rate such as to make the solution appear as if it were boiling. In this way, the surface of the solution is continually turned under. As bubbles rise from the surface and break on the surface, currents are also set up which augment the convection currents caused by the temperature differential in the system.

The amount of steam charged is sufficient to maintain the temperature of the solution between 65° and 85° C.

Yarn is sized using the resulting apparatus, and the run is continued for two hours, during which time skinning does not occur. The sized yarn is found to have a uniform film of polyvinyl alcohol, and no difficulties are encountered in maintaining a uniform film application.

Some foam forms in the corner as well as in other locations of the pool which are furthest removed from ebullition. The foam is unstable and continues to collapse as new foam is formed.

With the steam off and air on, it is still possible to maintain a skin-free solution. When the air is off and steam on, the edges of the solution begin to skin.

Example 2

Example 1 is repeated with the exception that an anti-foaming agent in an amount of 0.125 percent by weight of the solution is added to the solution. The anti-foaming agent contains an ethylene oxide adduct of acetylenic glycol as the active anti-foaming agent. The amount of foam is considerably less than in Example 1, and the foam that does form is made up of smaller bubbles than the foam in Example 1.

The run is continued for 2 hours, during which time no skinning occurs, and a uniform film of polyvinyl alcohol is applied to the yarn being sized.

Example 3

Example 2 is repeated, with the exceptional that an aqueous solution having 10 percent by weight of VINOL 260, described above, is used. Similar results are achieved.

The invention in its broader aspects is not limited to the specific compositions, steps and methods described, but departures may be made therefrom within the scope of the accompanying claims without departing from the principles of the invention and without sacrificing its chief advantages.

I claim:

1. In a method of sizing yarn from a pool of a sizing composition comprising an aqueous solution of polyvinyl alcohol, the polyvinyl alcohol having a degree of hydrolysis of between about 55 percent and 100 percent and a viscosity in 4 percent aqueous solution at 20° C. ranging from 2 to 150 centipoises, the temperature of the sizing composition being from about room temperature to the boiling point of the solution, the improvement of reducing the effects of skinning and gelation in the pool which comprises introducing into the pool below the surface thereof a gas inert to the contents of the pool and non-condensable in said pool and flowing the gas upwardly through the pool, the rate of flow of the gas being such that bubbles break from the surface of the pool, said introducing and flowing of said gas being effected simultaneously with the sizing of yaid yarn, and said aqueous solution of polyvinyl alcohol containing an adduct of a member selected from the group consisting of acetylenic alcohols and glycols with a member selected from the group consisting of ethylene oxide and propylene oxide.

2. A method of sizing yarn with a sizing composition comprising an aqueous solution consisting essentially of water and polyvinyl alcohol, which comprises establishing a pool of said sizing composition, passing said yarn through said pool, and simultaneously reducing the effect of skinning and gelation of said sizing composition in said pool by introducing into the pool below the surface thereof a gas inert to the contents of the pool and non-condensable in said pool, and flowing said gas upwardly through the pool, the rate of flow of the gas being such that bubbles break from the surface of the pool, the polyvinyl alcohol having a degree of hydrolysis of above about 99 percent and a viscosity in 4 percent aqueous solution at 20° C. ranging from 2 to 150 centipoises, the temperature of the sizing composition being from about room temperature to the boiling point of the solution and said introducing and flowing of said gas being effected simultaneously with the passing of said yarn through the pool.

3. The method of claim 2 wherein the polyvinyl alcohol concentration in the sizing composition is between about 1 percent and 40 percent by weight.

4. The method of claim 2 wherein the solution comprises an anti-foaming agent.

5. The method of claim 4 wherein the anti-foaming agent is an adduct of a member selected from the group consisting of acetylenic alcohols and glycols with a member selected from the group consisting of ethylene oxide and propylene oxide.

6. The method of claim 2 wherein the temperature of the solution is between about 65° and 85° C.

7. A method of sizing yarn as defined in claim 2 wherein the gas introduced below the surface of the pool has steam admixed therewith.

References Cited by the Examiner

UNITED STATES PATENTS

| | | | |
|---|---|---|---|
| 1,863,545 | 6/1932 | Raettig | 118—612 |
| 2,009,232 | 7/1935 | Hood | 118—429 |
| 2,521,334 | 9/1950 | Boerstra | 261—124 |
| 2,730,468 | 1/1956 | Martin | 261—124 |
| 3,093,510 | 6/1963 | Olson et al. | 118—429 |
| 3,098,370 | 7/1963 | Poole | 117—115 |

OTHER REFERENCES

"Elvanol," E. I. du Pont de Nemours & Co., second edition (1959), pp. 18, 57 and 62.

RICHARD D. NEVIUS, *Primary Examiner.*

WILLIAM D. MARTIN, *Examiner.*